(12) United States Patent
Rothrock

(10) Patent No.: US 7,395,262 B1
(45) Date of Patent: *Jul. 1, 2008

(54) TECHNIQUES FOR SEARCHING FOR BEST MATCHES IN TABLES OF INFORMATION

(75) Inventor: Michael R Rothrock, Scotts Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 10/706,151

(22) Filed: Nov. 12, 2003

Related U.S. Application Data

(63) Continuation of application No. 09/539,669, filed on Mar. 30, 2000, now Pat. No. 6,678,675.

(51) Int. Cl.
G06F 17/30 (2006.01)

(52) U.S. Cl. ............... 707/6; 707/1; 707/2; 707/3; 707/5; 707/6

(58) Field of Classification Search ........... 707/1–6, 707/104.1
See application file for complete search history.

(56) References Cited

U.S. PATENT DOCUMENTS

| | | | | |
|---|---|---|---|---|
| 4,868,743 A * | 9/1989 | Nishio | ................... | 707/3 |
| 5,043,872 A | 8/1991 | Cheng et al. | ................... | 707/2 |
| 5,305,389 A * | 4/1994 | Palmer | ................... | 382/305 |
| 5,386,413 A | 1/1995 | McAuley et al. | ................... | 370/54 |
| 5,452,451 A | 9/1995 | Akizawa et al. | ................... | 395/600 |
| 5,475,838 A * | 12/1995 | Fehskens et al. | ................... | 714/57 |
| 5,495,609 A * | 2/1996 | Scott | ................... | 707/8 |
| 5,644,736 A | 7/1997 | Healy et al. | ................... | 395/341 |
| 5,806,061 A * | 9/1998 | Chaudhuri et al. | ................... | 707/3 |
| 5,822,747 A | 10/1998 | Graefe et al. | ................... | 707/2 |
| 5,845,274 A | 12/1998 | Chadha et al. | ................... | 707/1 |
| 5,852,820 A | 12/1998 | Burrows | ................... | 707/2 |
| 5,864,845 A | 1/1999 | Voorhees et al. | ................... | 707/5 |
| 5,909,440 A * | 6/1999 | Ferguson et al. | ................... | 370/389 |
| 5,924,094 A | 7/1999 | Sutter | ................... | 707/10 |
| 5,974,407 A | 10/1999 | Sacks | ................... | 707/1 |
| 5,983,223 A | 11/1999 | Perlman | ................... | 707/6 |
| 6,011,795 A * | 1/2000 | Varghese et al. | ................... | 370/392 |
| 6,012,057 A * | 1/2000 | Mayer et al. | ................... | 707/6 |
| 6,021,409 A | 2/2000 | Burrows | ................... | 707/102 |
| 6,035,326 A | 3/2000 | Miles et al. | ................... | 707/206 |
| 6,061,679 A * | 5/2000 | Bournas et al. | ................... | 707/3 |
| 6,067,574 A * | 5/2000 | Tzeng | ................... | 709/247 |
| 6,185,557 B1 * | 2/2001 | Liu | ................... | 707/4 |
| 6,223,172 B1 | 4/2001 | Hunter et al. | ................... | 707/3 |
| 6,236,988 B1 | 5/2001 | Aldred | ................... | 707/3 |

(Continued)

Primary Examiner—Don Wong
Assistant Examiner—Hanh B Thai
(74) Attorney, Agent, or Firm—Townsend and Townsend and Crew LLP

(57) ABSTRACT

Techniques for searching for best matches in tables of information are provided. A first tree is traversed according to a first value for a first field and as information is encountered at each node, the information is written to a second tree. The second tree is traversed according to a second value for a second field to determine the best match for the first and second values. By utilizing the first and second trees, efficient searching for best matches can be achieved while allowing for dynamic modification of the data.

13 Claims, 13 Drawing Sheets

U.S. PATENT DOCUMENTS

| | | | |
|---|---|---|---|
| 6,266,660 B1 * | 7/2001 | Liu et al. | 707/3 |
| 6,347,340 B1 * | 2/2002 | Coelho et al. | 709/246 |
| 6,356,897 B1 | 3/2002 | Gusack | 707/4 |
| 6,377,957 B1 | 4/2002 | Jeyaraman | 707/200 |
| 6,381,605 B1 * | 4/2002 | Kothuri et al. | 707/100 |
| 6,381,607 B1 | 4/2002 | Wu et al. | 707/100 |
| 6,446,068 B1 * | 9/2002 | Kortge | 707/6 |
| 6,490,592 B1 * | 12/2002 | St. Denis et al. | 707/102 |
| 6,567,408 B1 * | 5/2003 | Li et al. | 370/395.31 |
| 6,662,180 B1 * | 12/2003 | Aref et al. | 707/6 |
| 6,662,184 B1 * | 12/2003 | Friedberg | 707/100 |
| 6,973,057 B1 * | 12/2005 | Forslow | 370/328 |
| 7,246,102 B2 * | 7/2007 | McDaniel et al. | 706/50 |

* cited by examiner

901

| ORIGIN | DESTINATION | IP ADDRESS | ROUTE |
|---|---|---|---|
| $O_1$ | $D_1$ | $A_1$ | $R_1$ |
| $O_2$ | $D_2$ | $A_2$ | $R_2$ |
| $O_3$ | $D_3$ | $A_3$ | $R_3$ |
| $O_4$ | $D_4$ | $A_4$ | $R_4$ |
| ⋮ | ⋮ | ⋮ | ⋮ |
| $O_N$ | $D_N$ | $A_N$ | $R_N$ |

FIG. 11

TECHNIQUES FOR SEARCHING FOR BEST MATCHES IN TABLES OF INFORMATION

This application is a continuation of U.S. patent application Ser. No. 09/539,669, filed Mar. 30, 2000, now issued as U.S. Pat. No. 6,678,675, which is hereby incorporated by reference.

BACKGROUND OF THE INVENTION

The present invention relates to retrieving desired information from a data structure that stores the information. More specifically, the invention relates to searching for best matches in tables of information utilizing at least one tree.

Computer systems are great tools for storing vast amounts of data. One way that the data is commonly stored is to utilize tables where each row represents a related subset of data. Oftentimes, the tables form the basic data structure of a relational database management system (RDBMS).

Some types of searches for data within a table are fairly straightforward. For example, if a table stores the names and addresses of customers and one wanted to determine the address of a customer named "John Smith," the user could specify that he or she is interested in the address fields of the row that included a name field of "John Smith." The computer system could search the rows in the table until the row with the desired name field was found and return the desired address fields. There are many known techniques that allow these simple searches to be performed very accurately and efficiently.

It should be obvious that not all user queries are as simple as described above. For example, a user could be searching for a row that is the best match for a first name field of "John" and a last name field "Smith." Furthermore, one of the fields may take precedence over the other field (or fields) in the case of a tie. Thus, if there is no row that has a first name field of "John" and last name field of "Smith," the computer system could return a best match of a customer named "Jack Smith."

One traditional approach to implementing a search as described above has been to utilize the construction of perfect hash functions. Although perfect hash functions can be fairly efficient, they are computationally expensive to compute. The expense of perfect hash functions is further increased when the system allows dynamic modification of the data because the dynamic modification of the data generally necessitates recomputation of the perfect hash functions.

What is needed, therefore, are innovative techniques for searching for best matches in tables of information. Additionally, it would be beneficial to provide the searching performance for perfect hash functions, while still allowing the dynamic modification of the data.

SUMMARY OF THE INVENTION

The present invention provides techniques for searching for best matches in tables of information. More specifically, an embodiment of the invention stores information from the rows of the table in a tree according to values in a field of the table. When a search is performed, the tree is traversed and information that is encountered is utilized to determine the best match in the table. With the invention, the searching performance can be highly efficient and yet allow for the dynamic modification of the data. Some specific embodiments of the invention are described below.

In one embodiment, the invention provides a computer implemented method of searching for best matches in a table. The table stores information in multiple rows where each row includes multiple fields. In performing a search, a first tree that stores information from the rows of the table according to a first value for a first field is traversed. Information that is encountered when traversing the first tree is saved in a second tree according to data in a second field. The second tree is then traversed according to a second value for the second field to determine the best match for the first and second values. In other embodiments, the search for best matches in the table can be based upon more than two values utilizing more than two trees.

In another embodiment, the invention provides a computer implemented method of searching for best matches in a table. First and second values are received where the first value indicates a desired value for a first field in the table and the second value indicates a desired value for a second field in the table. A first tree is traversed by the first value, wherein the first tree stores at each node information from the rows in the table according to data in the first field. As each node is traversed, the information that is encountered is saved to a second tree according to data in the second field. The second tree is then traversed according to the second value to determine the best match for the first and second values.

Other features and advantages of the invention will become readily apparent upon review of the following description in association with the accompanying drawings.

BRIEF DESCRIPTION OF THE DRAWINGS

FIG. 11 shows an example of a table that stores information for dynamic call routing in Voice Over IP that can be efficiently searched with embodiments of the invention.

DETAILED DESCRIPTION OF PREFERRED EMBODIMENTS

In the description that follows, the present invention will be described in reference to embodiments that search for best matches in tables that store information in rows. More specifically, the embodiments will be described in reference to tables that are searched for best matches of origin and destination telephone number prefixes. However, embodiments of the invention are not limited to the table data structure or telephone numbers nor are they limited to any particular language, computer architecture or specific implementation.

Therefore, the description of the embodiments that follows is for purposes of illustration and not limitation.

Figure 1:
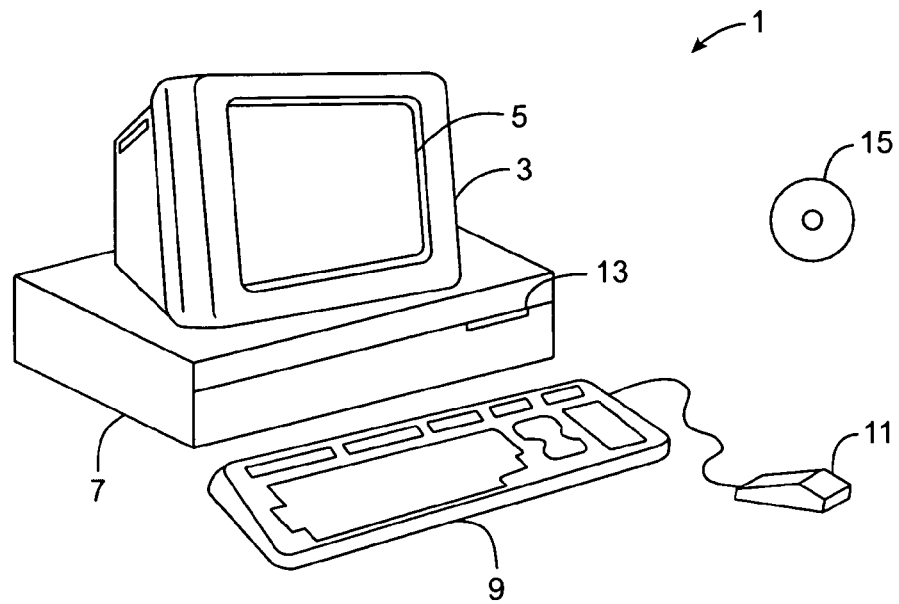
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
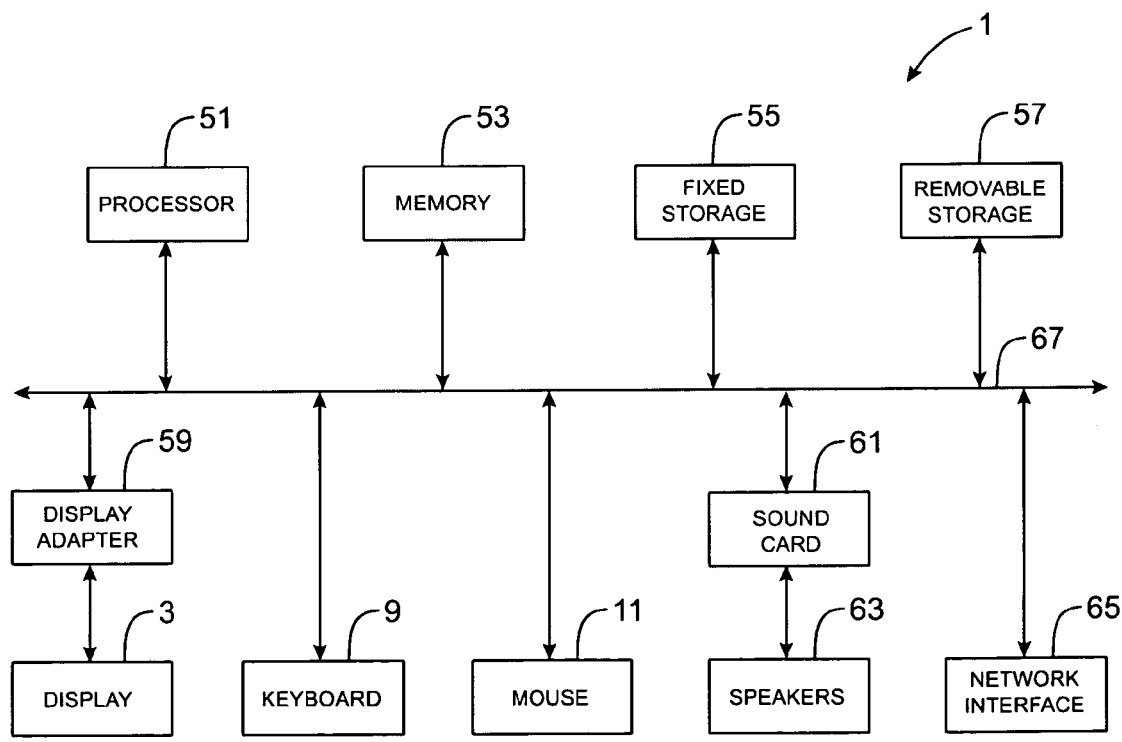
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
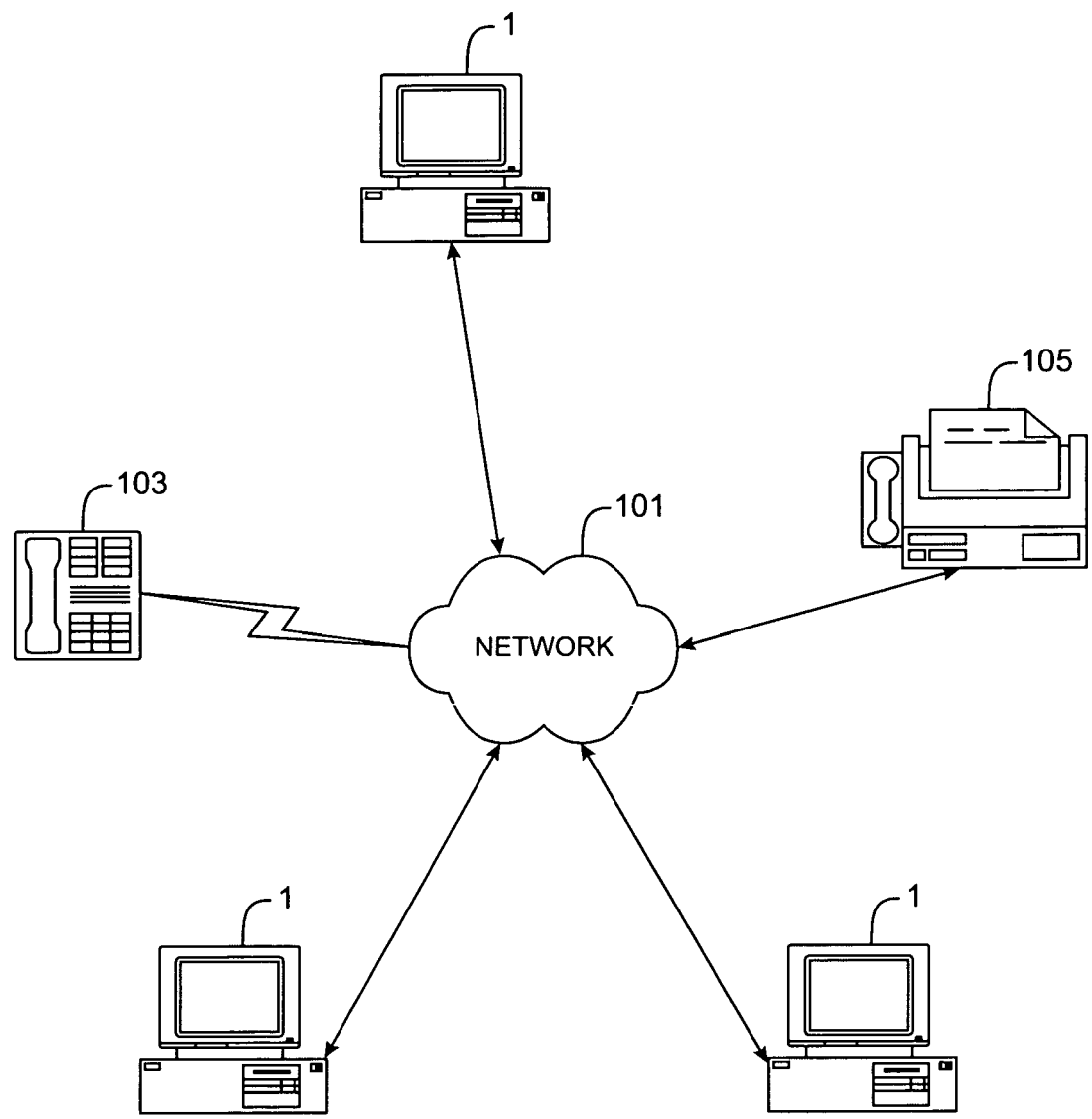
FIG. 3 illustrates a network of various devices including computer systems, fax machines and telephones.

FIG. 3 shows a network that includes multiple devices including computer systems, fax machines and telephones. A network 101 allows communication between the multiple devices shown. Computer systems 1 can be as described in reference to FIGS. 1 and 2. The computer systems are shown in communication with a telephone 103 and a fax machine 105.

The median through which the devices communicate in network 101 can be any number of ways known in the art. For example, computer systems 1 can include modems and communicate with the other devices on the network through telephone lines such as the public telephone network (PSTN). The devices may also communicate over a network using protocols such as Transmission Control Protocol/Internet Protocol (TCP/IP). Additionally, the devices may communicate utilizing wireless communication techniques as shown for telephone 103 (e.g., cellular telephones).

Figure 4:
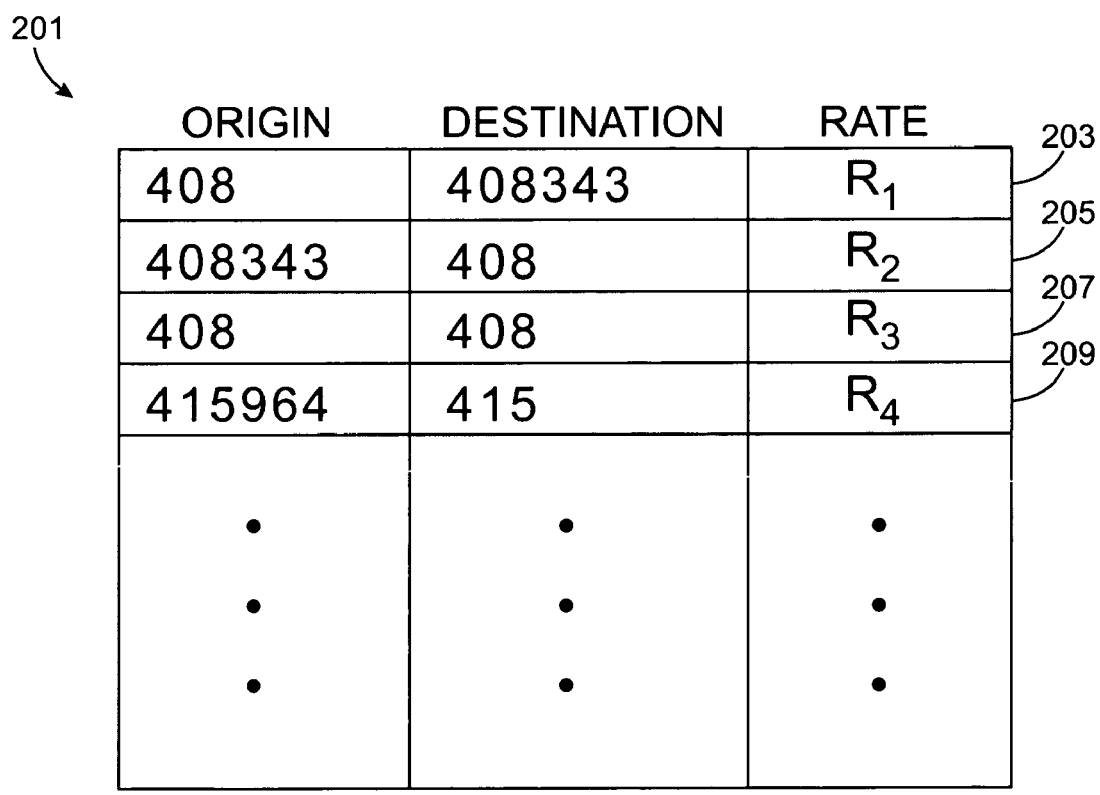
FIG. 4 shows an example of a table that stores origin and destination prefixes for telephone numbers along with an associated rate.

In order to better understand the invention, it may be beneficial to first describe a simple example. In one real world application, the rate for a telephone call may be based upon the origin and destination telephone numbers of the call. FIG. 4 shows a table that can be utilized to store the origin and destination prefixes along with their corresponding rate.

As shown in FIG. 4, a table 201 includes origin, destination and rate fields. Each of the rows 203-209 includes values for the origin prefix, destination prefix and rate. In this example, if multiple rows are applicable to a telephone call, the row with the longest match should be utilized. Furthermore, a longer origin prefix match takes precedence over a longer destination match. In other embodiments, different preferences can be specified.

Figure 5:
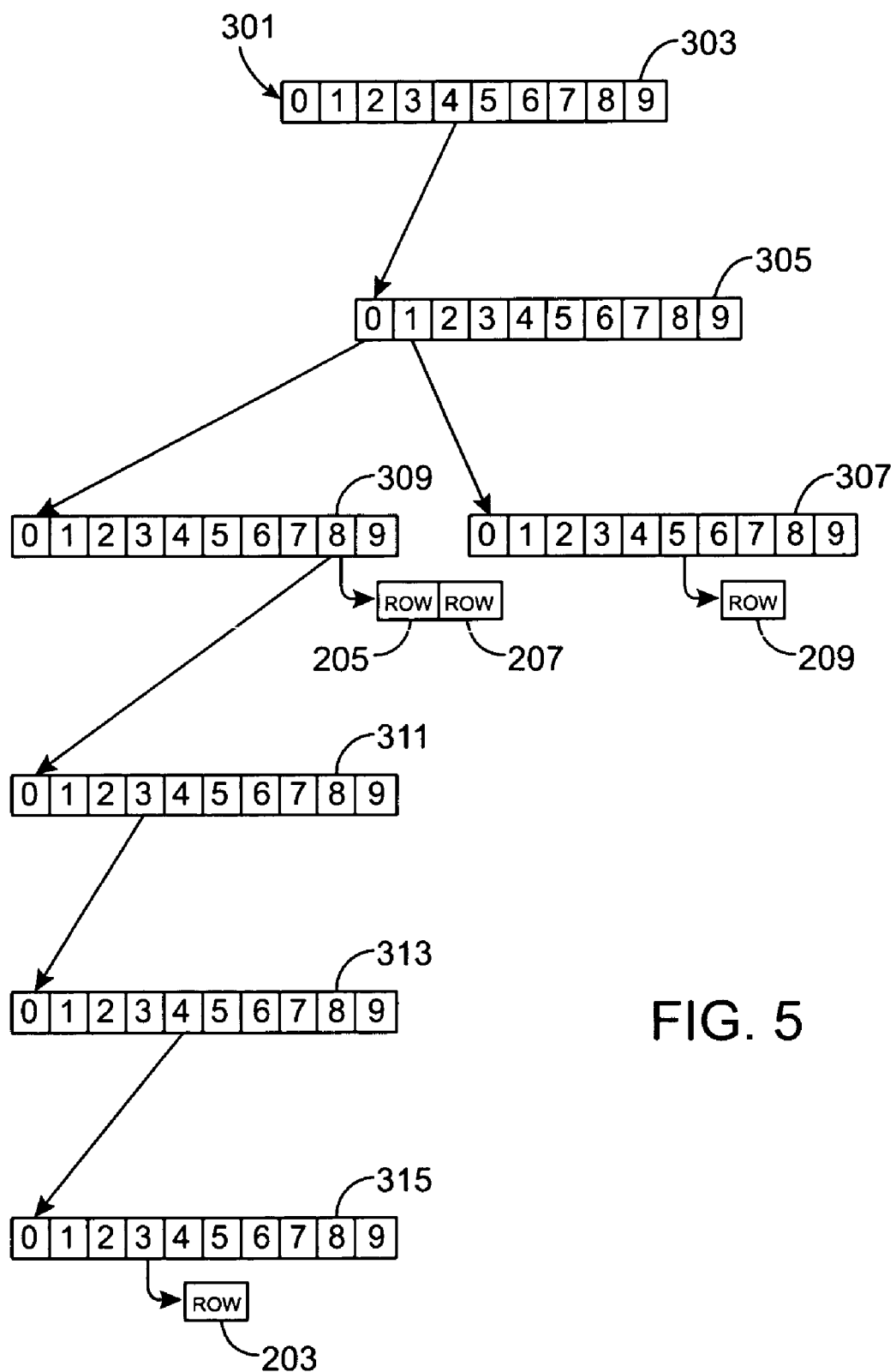
FIG. 5 shows one embodiment of a tree that stores information from the rows of a table according to values in a field.

In order to search for best matches, the information in the table is first stored in a tree. FIG. 5 shows one embodiment of a tree that can be utilized to store the information from the table of FIG. 4. A pointer 301 points to the top level of the tree. An array 303 includes all of the possible numerical digits 0-9. At each numerical digit node, the node can store pointers to other arrays, information from the table, and other information as desired.

As shown, node "4" of array 303 points to an array 305. Node "1" of array 305 points to an array 307. Within node "5" of array 307 is a pointer to row 209 to indicate that information from row 209 of FIG. 4 is stored off of this node. The information stored can be a portion or all of the information in the row. In preferred embodiments, all the information from the row is stored at the appropriate node.

When the tree shown in FIG. 5 is traversed utilizing the telephone number prefix "415," node "5" of array 307 would be reached and the information from row 209 is stored at this location because the destination prefix for the row is "415." The tree shown in FIG. 5 stores information and is traversed according to the destination prefix because in this example, a longer origin prefix takes precedence over a longer destination prefix.

Continuing with the description of FIG. 5, node "0" of array 305 points to an array 309. Off of node "8" of array 309 are rows 205 and 207. The information from rows 205 and 207 are stored off of this node because these rows have a destination prefix of "408." Rows 205 and 207 can be stored in a linked list structure or in any number of ways known in the art.

Additionally, node "8" of array 309 points to an array 311, which points to an array 313, which points to an array 315, in which node "3" of array 315 points to row 203. The information from row 203 is stored off of this node because if the tree is traversed utilizing the destination prefix "408343," node "3" of array 315 would be reached. Although the tree shown in FIG. 5 shows the storage of information from all the rows shown in FIG. 4, in typical applications there are hundreds (thousands or more) of rows so the tree can be substantially larger. However, the operation of the tree can be an extension of the principles described herein.

In this example, the computer system will be given an origin telephone number and a destination telephone number so that the correct rate can be determined. FIG. 5 shows a first tree that can be generated in order to efficiently determine the correct rate or a rate that best matches the origin and destination telephone numbers. In preferred embodiments, a second tree is utilized, however, the second tree can be generated while a search is being performed to find the best match. Therefore, the generation of the second tree will be described in reference to the following search within this example.

Figure 6A:
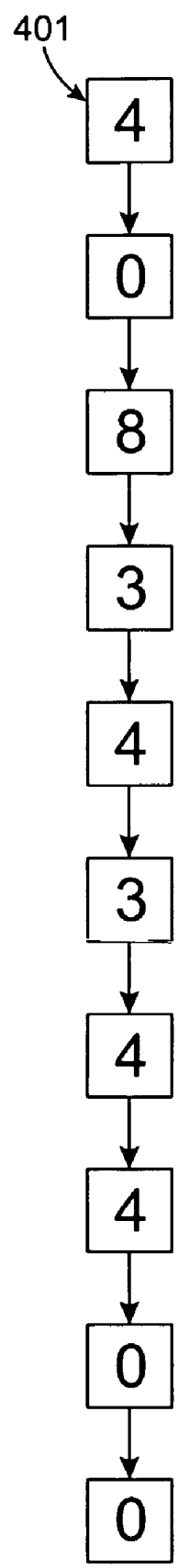
FIGS. 6A-6D show how information that is encountered when traversing the tree shown in FIG. 5 can be added to another tree.

Assume that a user is making a phone call from origin telephone number 408-343-4400 and destination telephone number 408-343-4401. Initially, the computer system can generate tree 401 as shown in FIG. 6A based on the origin telephone number. Although the data structure of tree 401 can be implemented similarly to the tree shown in FIG. 5, tree 401 typically has only one branch at each level if only two values are being utilized for the best match in the table. The principles of the invention can be applied to utilizing more than two values for determining the best match and in that case, tree 401 may include multiple branches at certain levels and there may be a third tree that has only one branch per level. Therefore, the term "tree" is being used to indicate a data structure that hierarchically orders data and does not necessarily include multiple "branches" on a level.

Figure 6B:
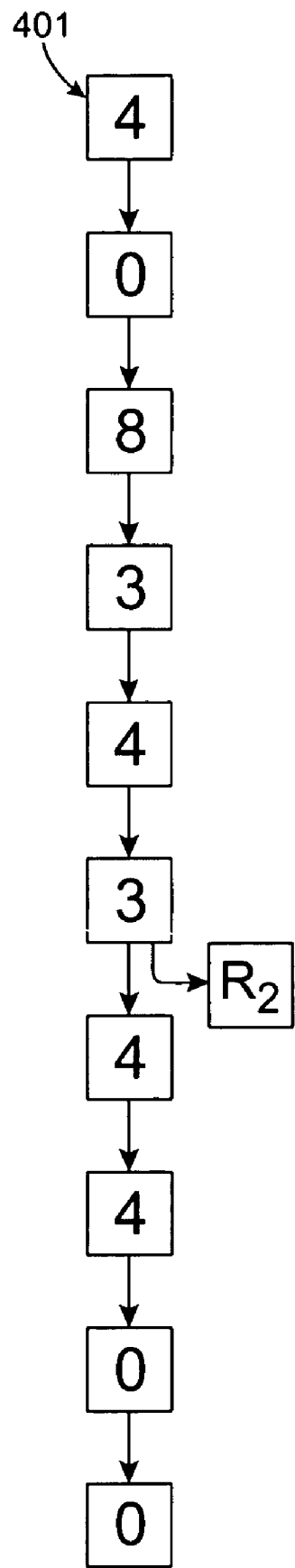

Beginning with the destination telephone number 408-343-4401, the computer system traverses tree 301 of FIG. 5. At each node that is traversed, if there is information from a row stored at the node, the information (or a portion thereof) is saved on tree 401 shown in FIGS. 6A-6D. At array 303, node "4" is traversed but no information from the table is stored at this node. Similarly, node "0" of array 305 is traversed without encountering any information from the table. When node "8" of array 309 is traversed, rows 205 and 207 are encountered. Beginning with row 205, the origin prefix "408343" of the row is accessed. Tree 401 of FIG. 6A is then traversed according to this origin prefix. When the final node is reached, the rate, here rate $R_2$, is saved off the node as shown in FIG. 6B.

Figure 6C:
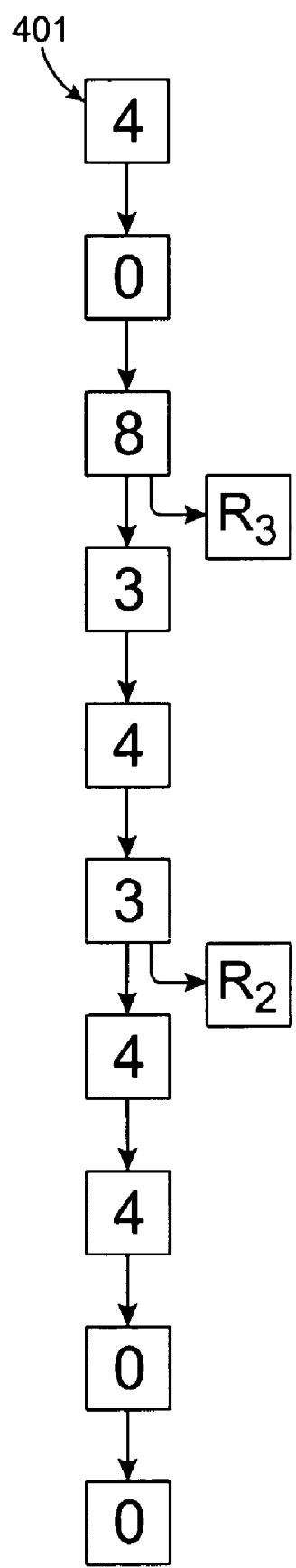

Returning to FIG. 5, row 207 is then accessed to identify the origin prefix "408." Tree 401 is traversed and rate $R_3$ from row 207 is saved off of node "8" of tree 401 as shown in FIG. 6C. Since all the information off of node "8" of array 309 has been accessed, tree 301 is traversed further according to the destination telephone number to array 311, array 313 and node "3" of array 315.

Figure 6D:
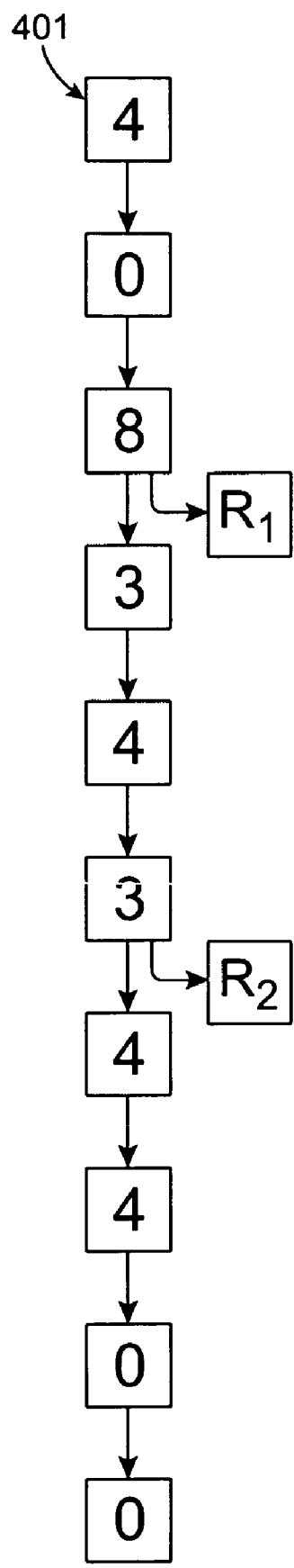

Off node "3" of array 315 is row 203. Row 203 is accessed and the origin prefix "408" is utilized to traverse tree 401 and the rate $R_1$ is saved off node "8" of tree 401. It should be noted that in preferred embodiments, if there is already information stored off a node of the second tree (e.g., node "8" of tree 401), the new information overrides the old information as shown in FIG. 6D. In other embodiments, the information is not overwritten and can be stored in a data structure such as a linked list and is preferably sorted according to the length of the destination prefix to attain the desired precedence.

Now that tree 301 has been traversed according to the destination telephone number 408-343-4401, tree 401 is traversed according to the origin telephone number 408-343-4400. As tree 401 is traversed, the information that was last encountered will be utilized as the rate. Thus, when node "8" is encountered the rate will be set equal to $R_1$. When the subsequent node "3" is encountered that points to rate $R_2$, the rate will be set to $R_2$. Since the subsequent nodes do not indicate a different rate, rate $R_2$ is determined to be the best match for the origin and destination telephone numbers. In some embodiments, the rate is initially set to a default value so that if none of the nodes point to a rate, then the default value will be utilized.

By traversing the first tree according to the destination telephone number and the second tree according to the origin telephone number, the longest origin match will take precedence. Furthermore, by overriding values in the second tree, the row with the longest destination telephone number match will be selected when the origin prefix matches are equal. Now that a simple example has been described, flow charts that illustrate the invention will be described.

Figure 7:
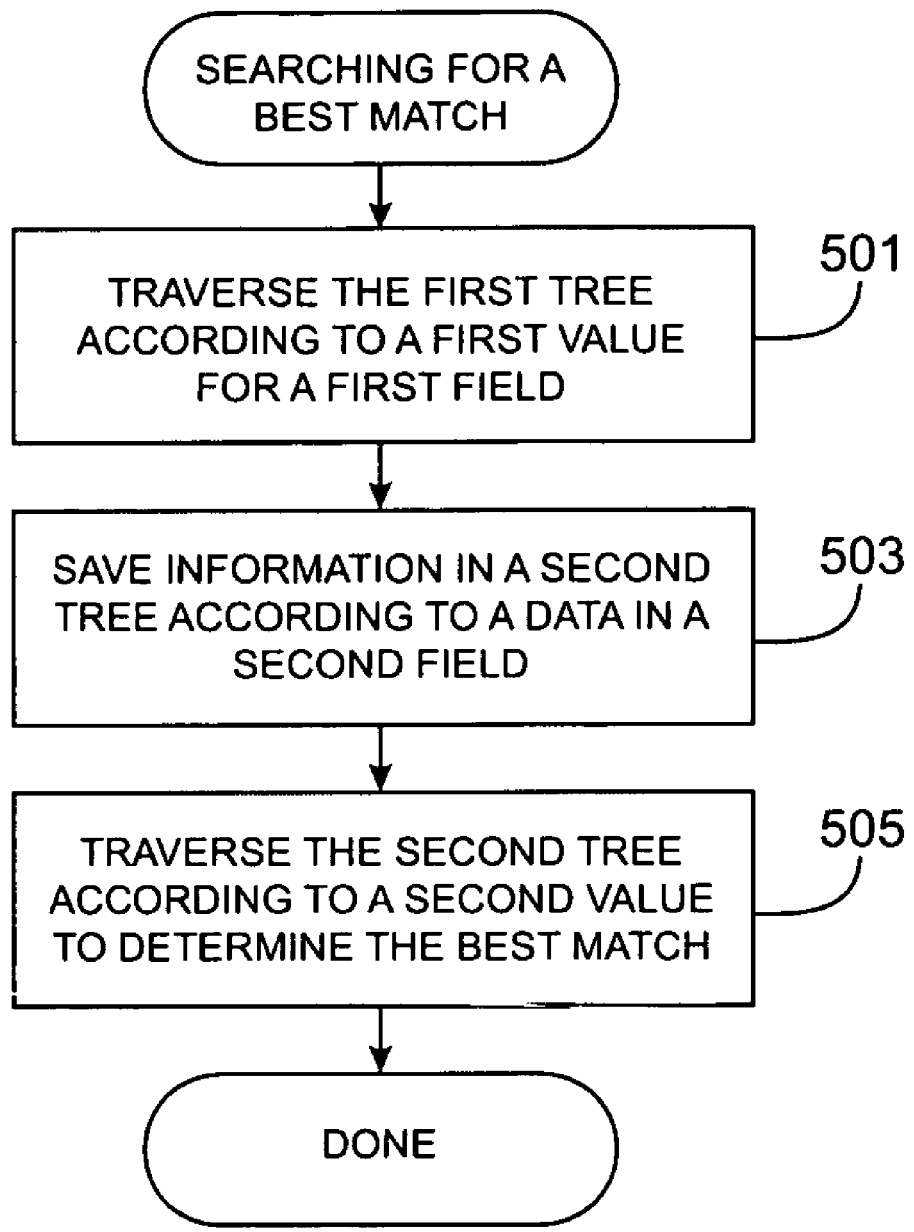
FIG. 7 shows a flowchart of a process of searching for a best match utilizing first and second trees.

FIG. 7 shows a flowchart of a process of searching for the best match in a table. In preferred embodiments, the first tree is generated prior to performing the search. By generating the first tree according to the data in the table a priori, the search speed can be significantly increased. Furthermore, when the data is dynamically modified, the first tree can be easily updated to reflect the change in data.

At a step 501, the first tree is traversed according to a first value for a first field. As the first tree is being traversed, information that is encountered is saved in a second tree according to data in a second field at step 503. The information that is stored in the first and second trees can include the whole row or only portions thereof. At a step 505, the second tree is traversed according to a second value for the second field to determine the best match. The first and second values are the values for the best match in the table.

Figure 8:
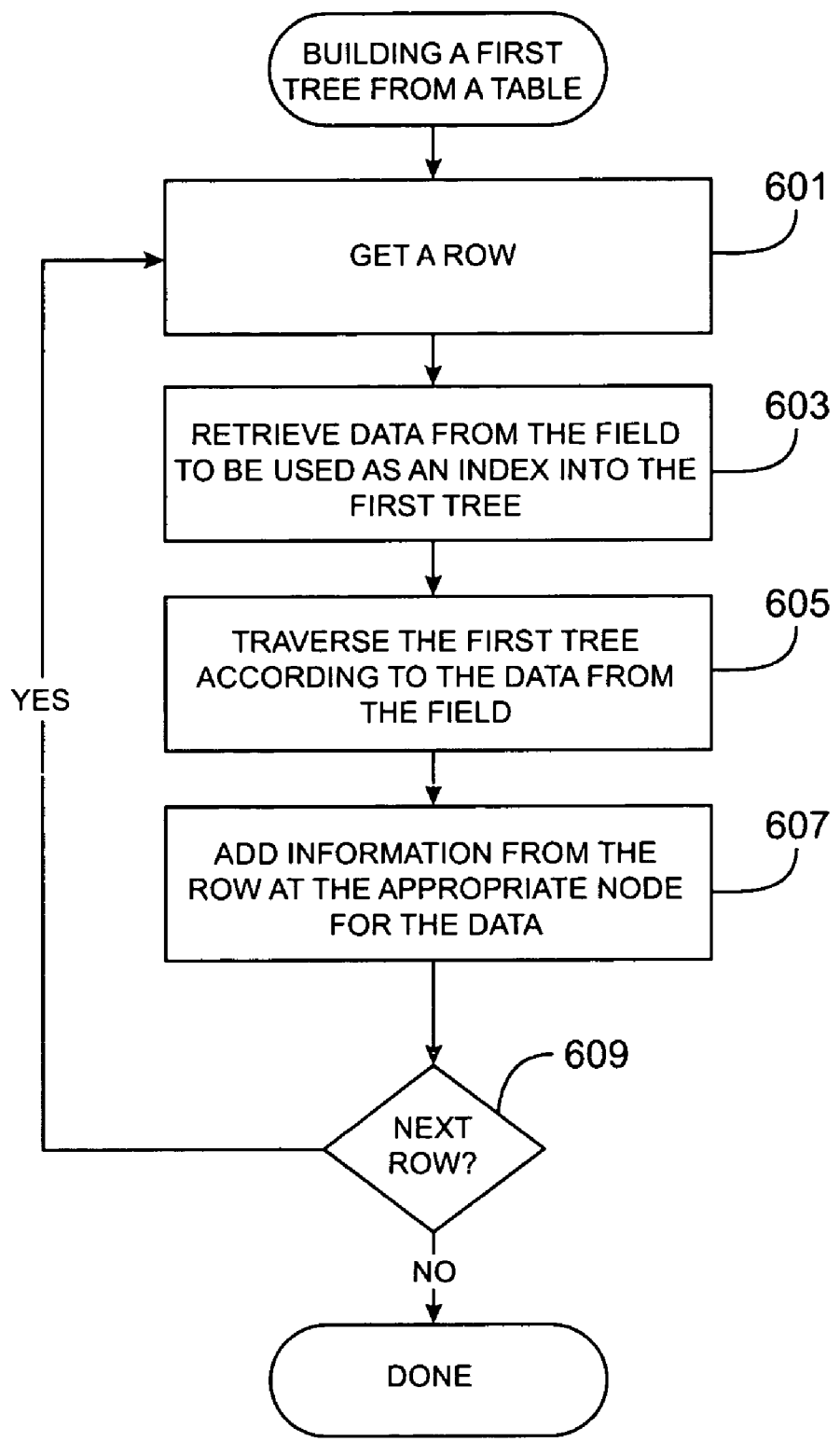
FIG. 8 shows a flowchart of a process of building a first tree from a table that stores information in rows.

As mentioned previously, the flowchart of FIG. 7 assumes that the first tree has already been built from the table. FIG. 8 shows a flowchart of a process of building a first tree. At a step 601, a row of the table is retrieved. Data from the field to be used as an index into the first tree is then retrieved at a step 603. The first tree is then traversed according to the data of the field at a step 605. If nodes are not currently present in the first tree, the nodes are added to accommodate the data from the field.

At a step 607, information from the row is added at the appropriate node for the data. Once the information is added, it is determined at a step 609 whether there is another row to be processed. If there is another row to be processed, the flow proceeds to step 601 to process the next row. Otherwise, the first tree has been built from the table.

Figure 9:
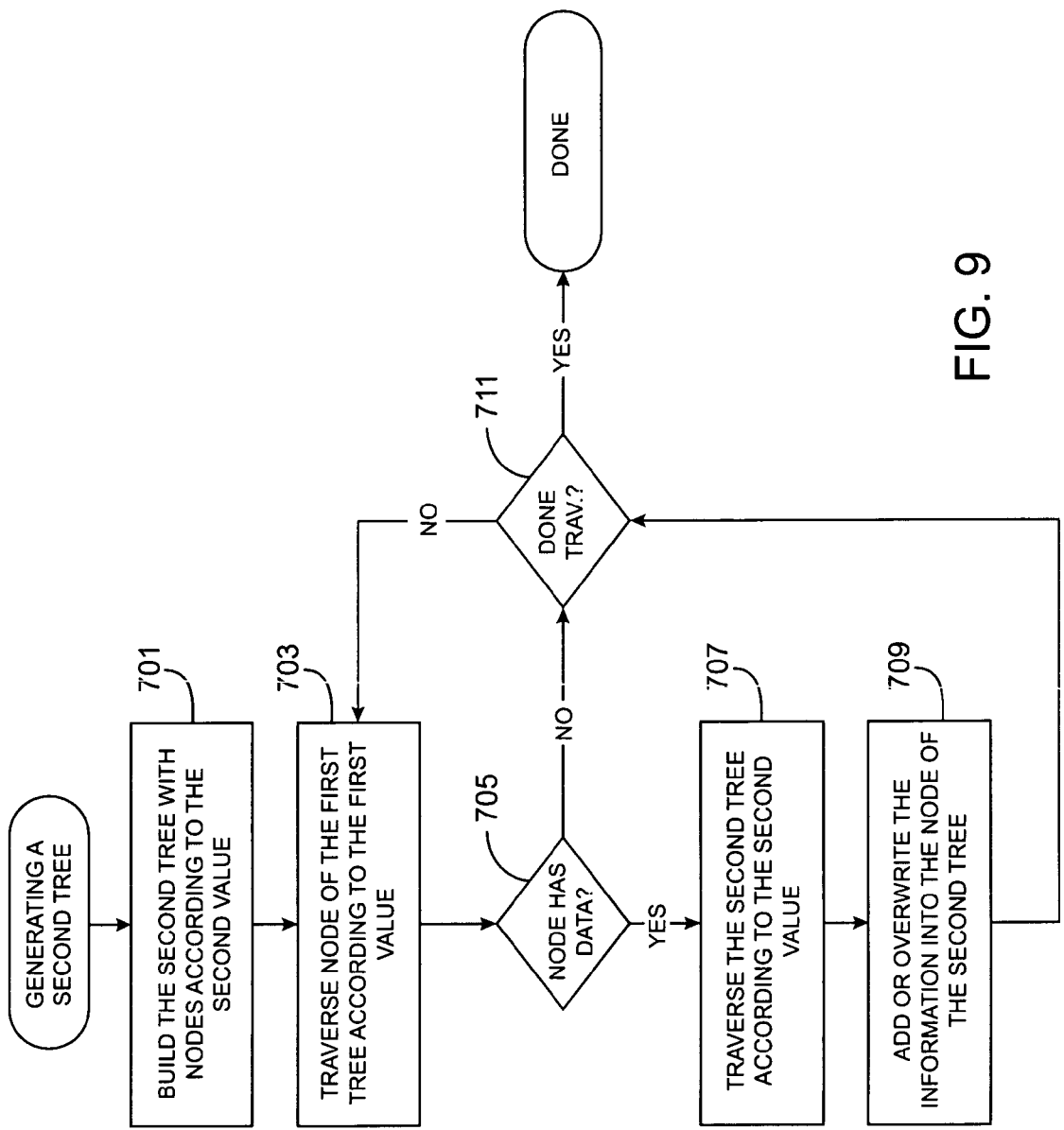
FIG. 9 shows a flowchart of a process of generating a second tree while traversing the first tree as built in FIG. 8.

FIG. 9 shows a flowchart of a process of generating a second tree. At a step 701, the second tree is built with nodes according to the second value (see FIG. 6A). A node of the first tree is then traversed according to the first value at a step 703. It is determined at a step 705 whether the node has data stored therein, such as by a pointer to a row as described previously. If a row is stored at the node, the second tree is traversed according to data in the second field that is stored at the node at a step 707.

Once the appropriate node has been found in the second tree, the information is added or overwritten into the node of the second tree at a step 709 (see FIGS. 6B-6D). At a step 711 it is determined whether the first tree has been traversed. If the first tree has not been completely traversed, the flow proceeds to step 703. Otherwise, the second tree has been generated.

Figure 10:
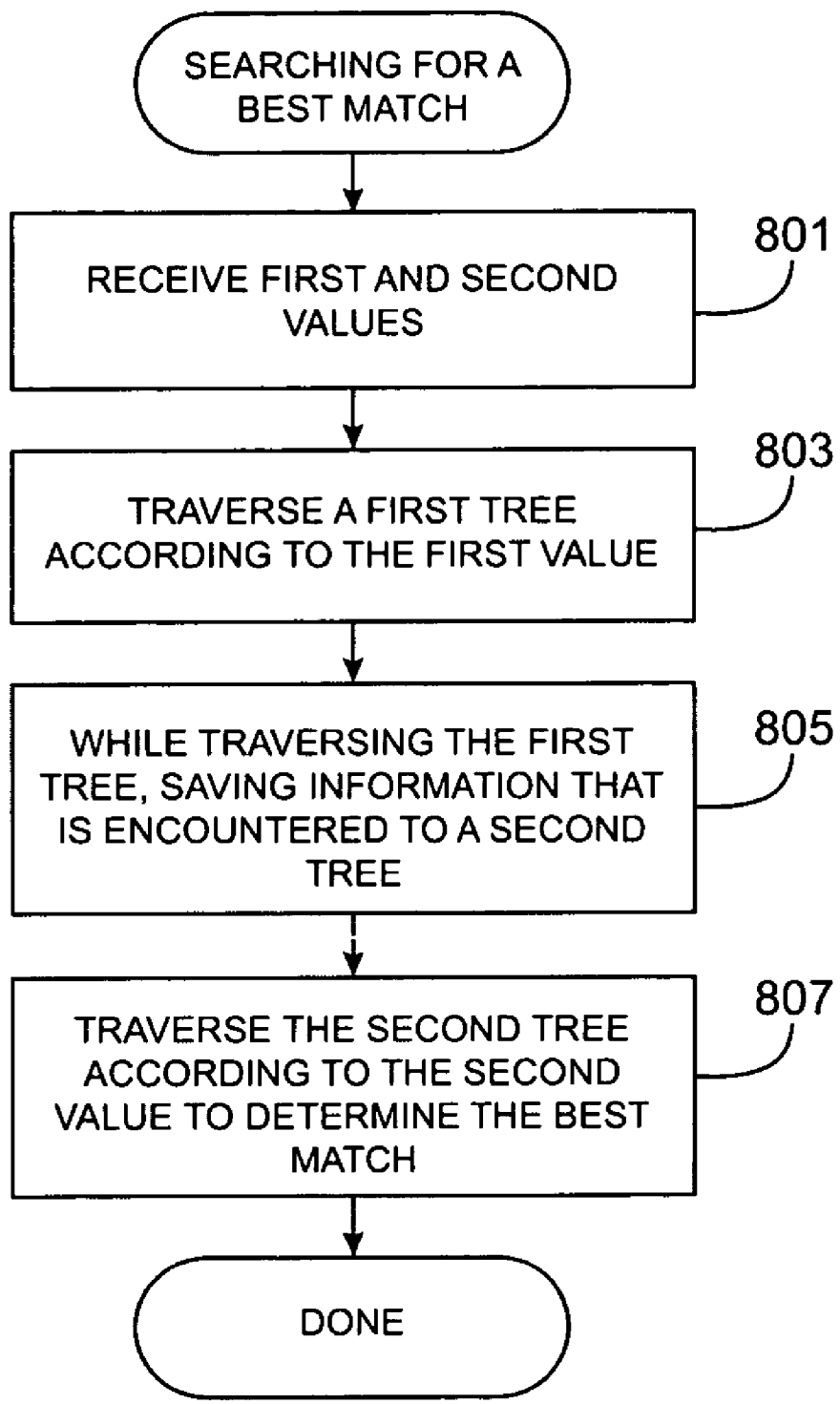
FIG. 10 shows a flowchart of another process of searching for a best match utilizing first and second trees.

FIG. 10 shows a flowchart of another process for searching for a best match. At a step 801, first and second values are received. A first tree is traversed according to the first value at a step 803.

While traversing the first tree, information that is encountered is saved to a second tree at a step 805. At a step 807, the second tree is traversed according to the second value to determine the best match.

The description and examples above have described the determination of a rate for origin and destination telephone numbers. Just as the invention is not limited to searching for the best match for only two values, other data (i.e., not just a rate) can also be stored in the table. As an example, the invention can be advantageously applied to dynamic call routing in Voice Over IP. On Voice Over IP, the destination IP address and the route to reach it is a function of both the origin and destination phone numbers. Furthermore, the data may change both infrequently (in the case of follow me roaming—a few times a day) and very frequently (in the case of mobile IP-several times a minute). In either event, the present invention provides significant advantages over prior art perfect hash table functions.

FIG. 11 shows a table that can be utilized for dynamic call routing in Voice Over IP. A table 901 includes origin and destination telephone numbers. Additionally, table 901 includes fields for the IP address and route. Dynamic call routing in Voice Over IP can be implemented as described above where the IP address and route are stored in the second tree instead of the rate as described.

All the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that defined by the metes and bounds of the appended claims along with their full scope of equivalents.

What is claimed is:

1. A computer-implemented method of searching for best matches in a table storing information for dynamic call routing, the method comprising:
generating a first tree comprising first tree data, wherein the first tree data stores information from rows of the table including the information for dynamic call routing;
dynamically modifying the information for dynamic call routing in the table;
updating the first tree data based on the dynamically modified information for dynamic call routing;
traversing the first tree according to a first value for a first field of the table; and
generating a second tree comprising second tree data wherein generating the second tree comprises saving in the second tree the information that is encountered when traversing the first tree.

2. The method of claim 1, further comprising traversing the second tree according to a second value for a second field of the table to determine a best match for the first and second values.

3. The method of claim 1, wherein the second tree data comprises an IP address and route.

4. The method of claim 3, wherein the IP address is a Voice Over IP address.

5. The method of claim 4, wherein the information for dynamic call routing in the table comprises an origin phone number, a destination phone number, the IP address, and the route.

6. The method of claim 5, wherein updating the information for dynamic call routing in the table comprises updating the IP address and the route.

7. The method of claim 6, wherein the IP address comprises an IP address of a mobile device.

8. A system comprising:
a processor; and
a memory coupled with the processor and having stored therein computer code for causing the processor to search for best matches in a table storing information for dynamic call routing by:
generating a first tree comprising first tree data, wherein the first tree data stores information from rows of the table including the information for dynamic call routing;
dynamically modifying the information for dynamic call routing in the table;
updating the first tree data based on the dynamically modified information for dynamic call routing;
traversing the first tree according to a first value for a first field of the table; and
generating a second tree comprising second tree data wherein generating the second tree comprises saving in the second tree the information that is encountered when traversing the first tree.

9. The system of claim 8, wherein searching further comprises traversing the second tree according to a second value for a second field of the table to determine a best match for the first and second values.

10. The system of claim 9, wherein the information for dynamic call routing in the table comprises an origin phone number, a destination phone number, the IP address, and the route.

11. The system of claim 10, wherein the second tree data comprises the IP address and the route.

12. The system of claim 10, wherein the IP address is a Voice Over IP address.

13. The system of claim 12, wherein updating the information for dynamic call routing in the table comprises updating the IP address and the route.

* * * * *

UNITED STATES PATENT AND TRADEMARK OFFICE
CERTIFICATE OF CORRECTION

PATENT NO. : 7,395,262 B1
APPLICATION NO. : 10/706151
DATED : July 1, 2008
INVENTOR(S) : Rothrock It is certified that error appears in the above-identified patent and that said Letters Patent is hereby corrected as shown below:

On the face page, in field 75, in column 1, under "Inventor", line 1, after "R" insert -- . --.

In column 6, line 48, delete "On" and insert -- In --, therefor.

Signed and Sealed this

Seventeenth Day of November, 2009

David J. Kappos
*Director of the United States Patent and Trademark Office*